J. BORBASH.
HAM AND MEAT PRESS AND BINDING APPARATUS.
APPLICATION FILED JAN. 21, 1914.

1,177,168.

Patented Mar. 28, 1916.
5 SHEETS—SHEET 1.

WITNESSES:

INVENTOR.
John Borbash
BY
Alexander Jones
ATTORNEY.

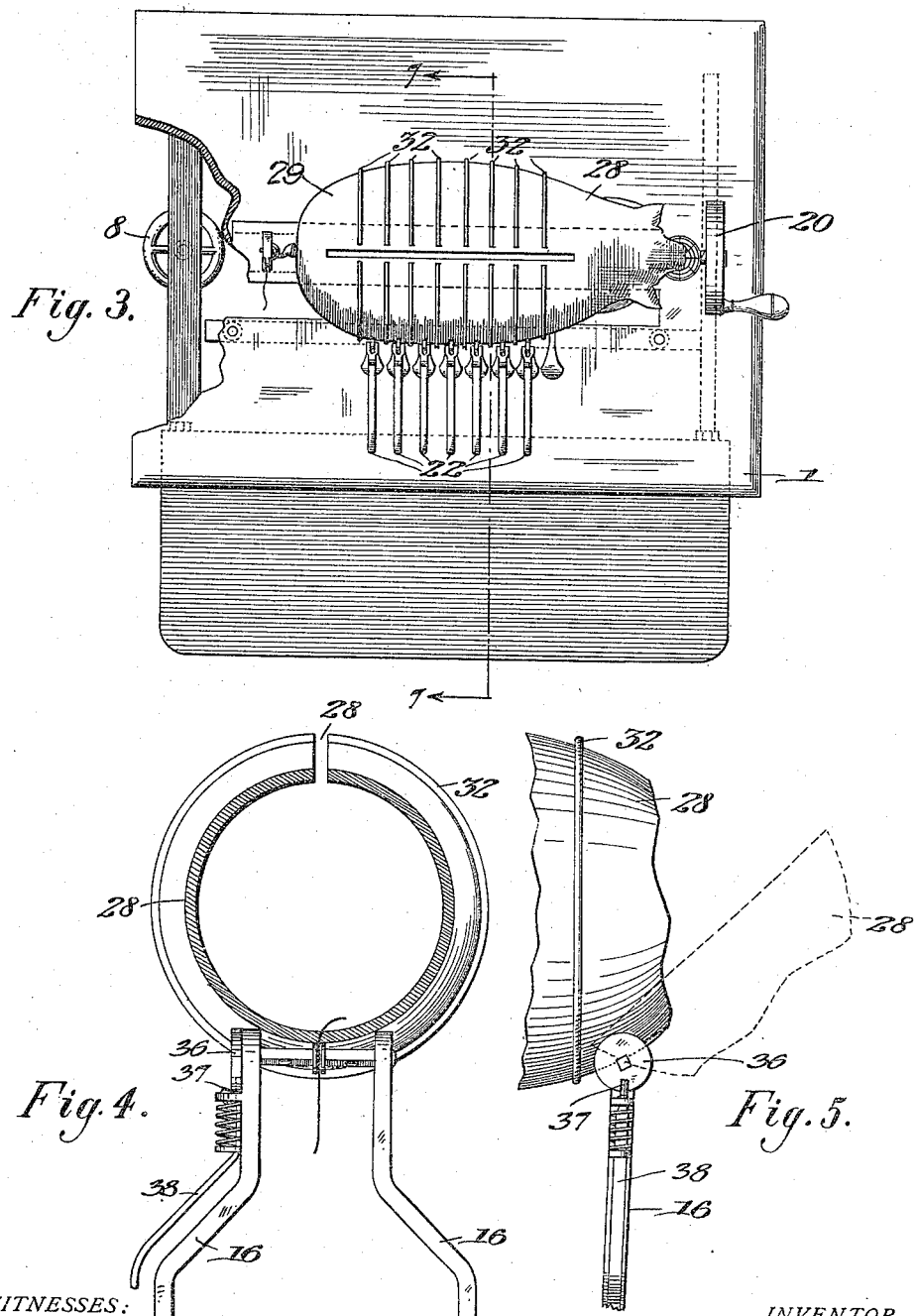

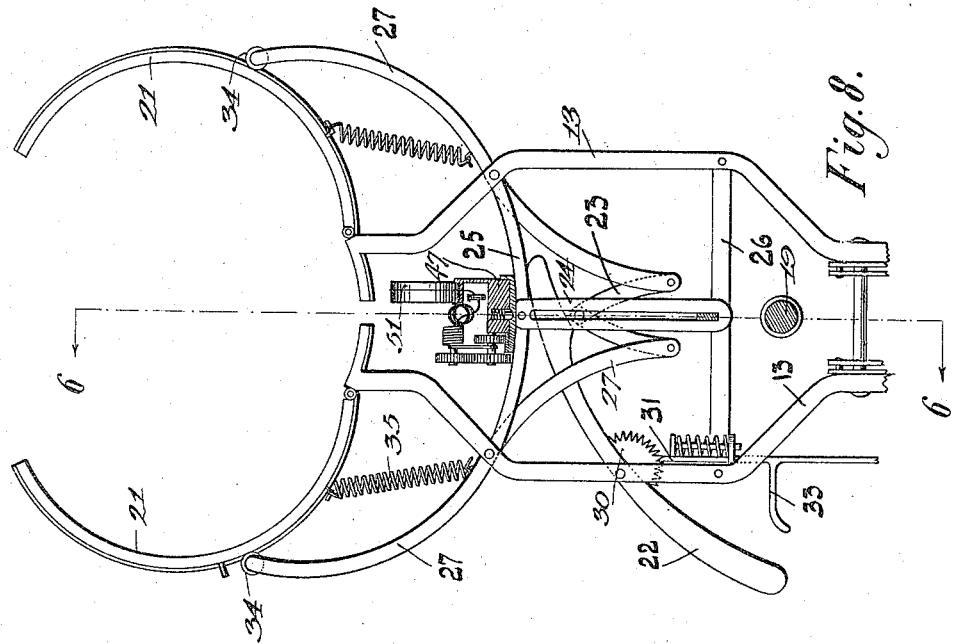
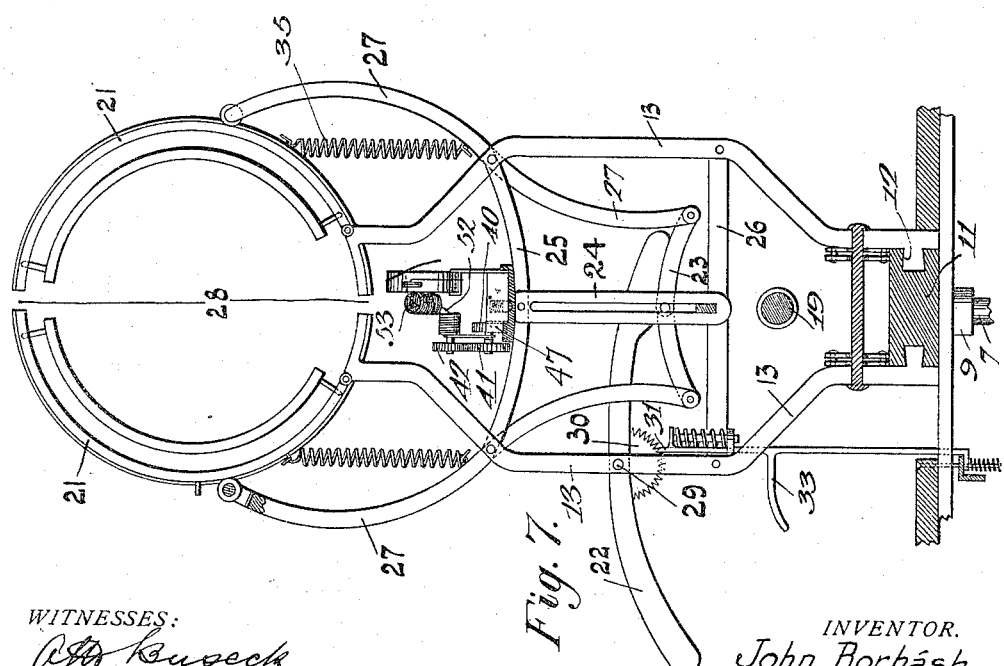

UNITED STATES PATENT OFFICE.

JOHN BORBÁSH, OF NEW YORK, N. Y.

HAM AND MEAT PRESS AND BINDING APPARATUS.

1,177,168.  Specification of Letters Patent.  Patented Mar. 28, 1916.

Application filed January 21, 1914. Serial No. 813,566.

*To all whom it may concern:*

Be it known that I, JOHN BORBÁSH, a subject of the King of Hungary, residing at New York, in the county of New York and State of New York, have invented new and useful Improvements in Ham and Meat Presses and Binding Apparatus, of which the following is a specification.

This invention relates to improvements in meat pressing machines and has for its object to provide a device of this character which is simple in construction, efficient in operation and eliminates much of the manual labor in the process of pressing and binding meat.

Hitherto the work of pressing and binding meat into loaf form has been performed mostly by manual labor, in consequence of which, there is often considerable moisture left in the pressed meat which, after a short time, causes decay thereby impairing the quality and usefulness of the article. In this device the moisture can be thoroughly pressed out of the meat and the binding done much quicker than by hand.

Figure 1:
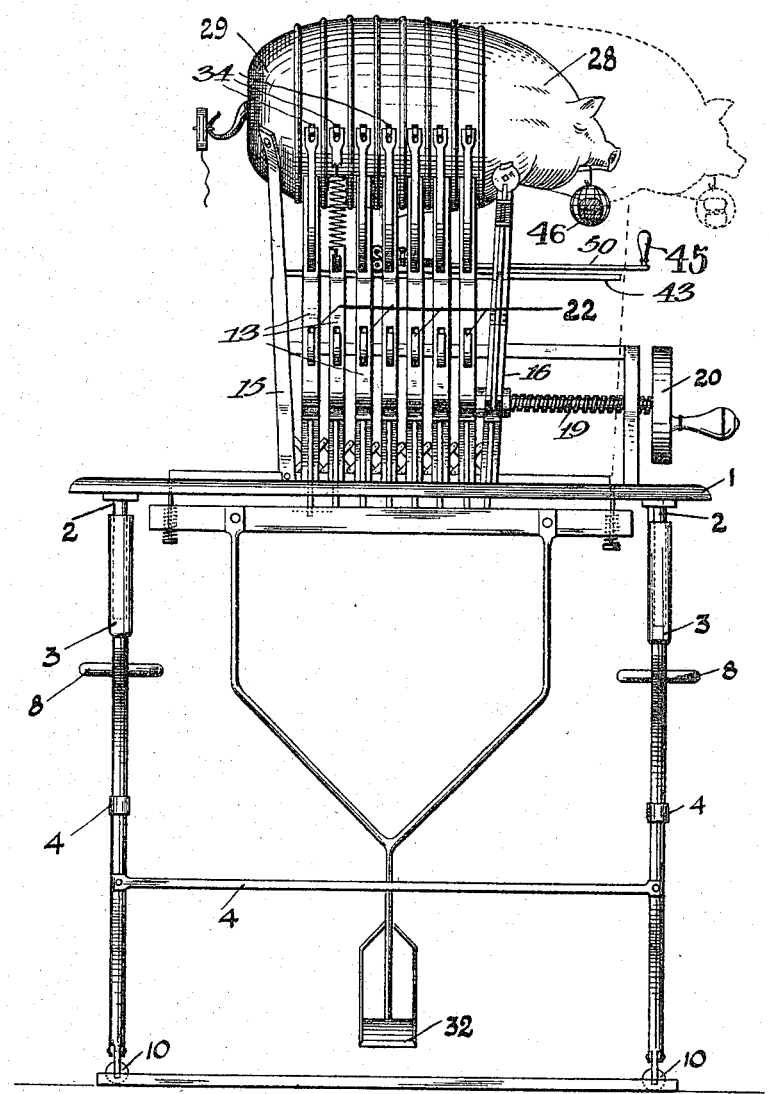
Figure 2:
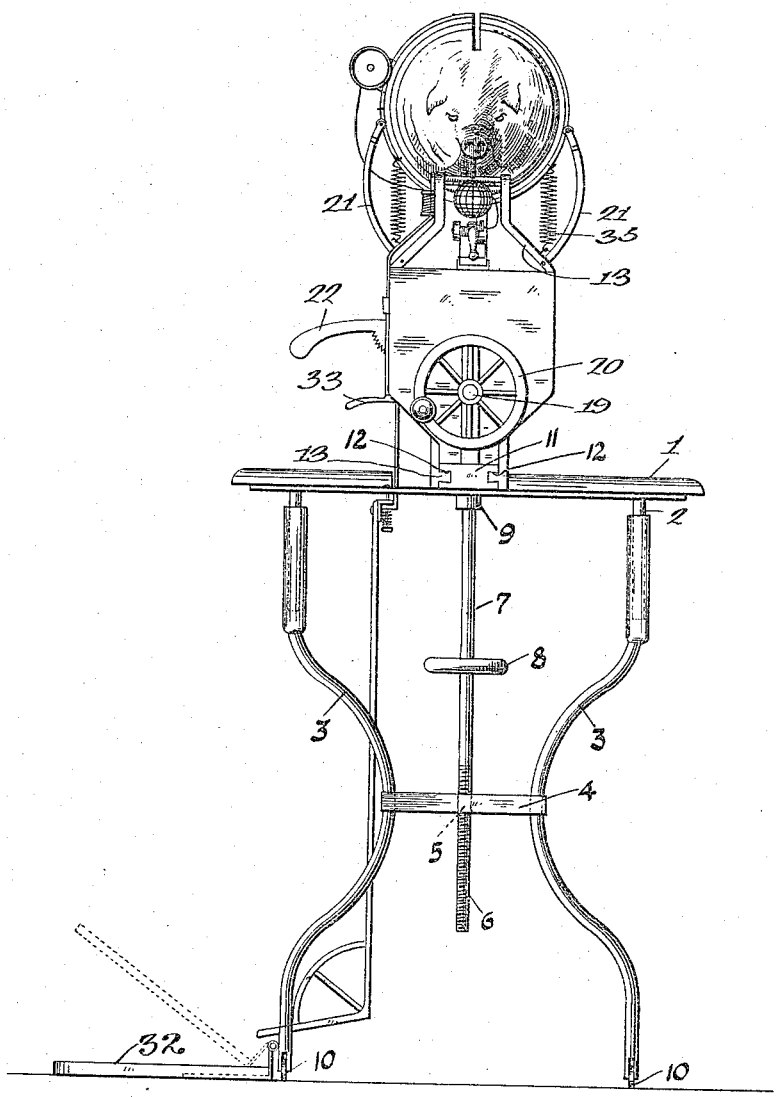
Figure 6:
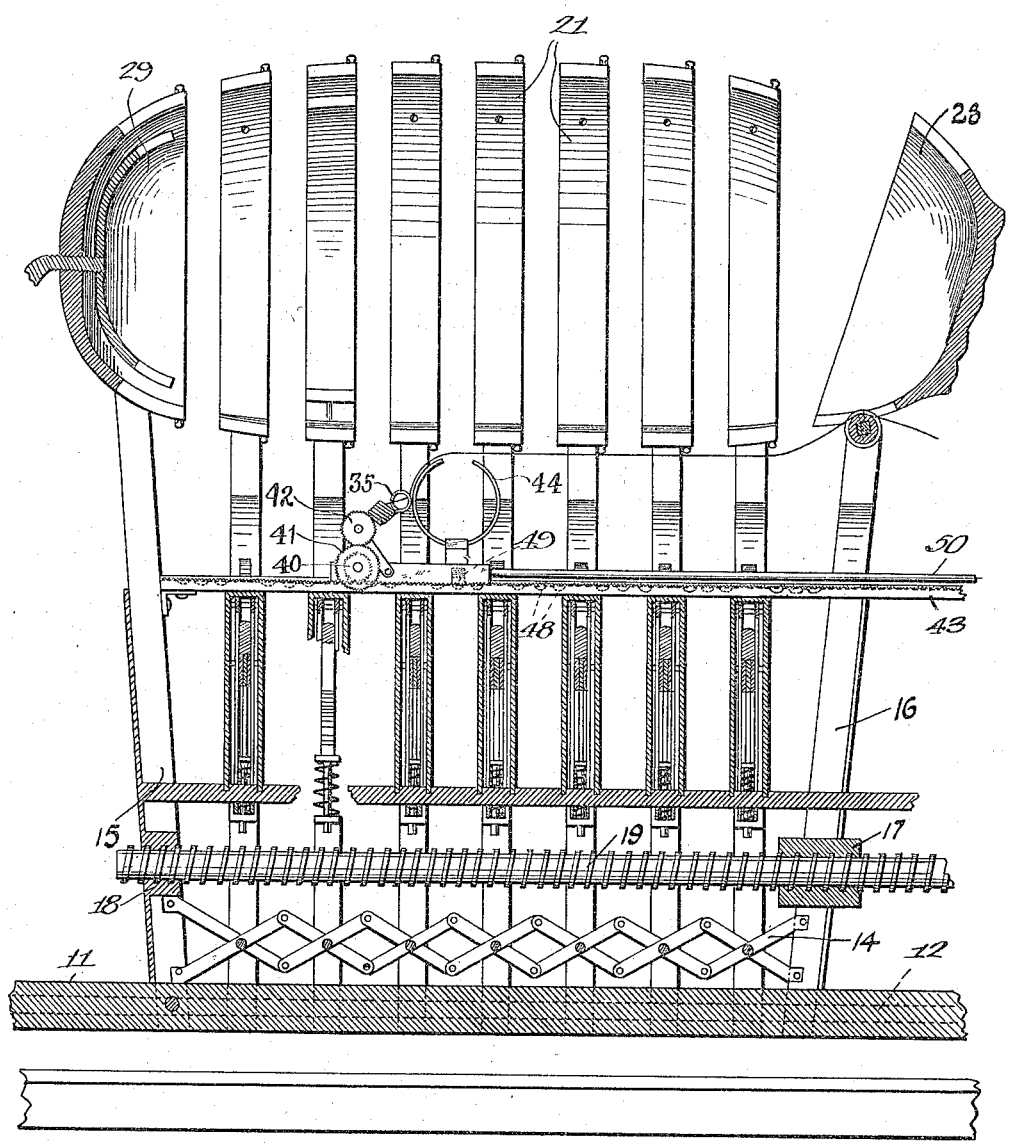

In the drawings annexed hereto, and forming a part of this specification:—Figure 1 is a side elevation of the complete machine. Fig. 2 is a front elevational view of the same. Fig. 3 is a top plan view of the machine, a portion of the table broken away for the purpose of showing details. Fig. 4 is an end view of the first section of the mold, shown partly in section. Fig. 5 is a side view of the parts shown in Fig. 4. Fig. 6 is a sectional view of the mold and operating levers, taken on line 6—6 of Fig. 8. Fig. 7 is an end view through a section of the mold, taken on line 7—7 of Fig. 3. Fig. 8 is a section on the same line as Fig. 7, but showing the parts in an opened position instead of closed as shown in Fig. 7.

The machine described comprises a table top 1 supported on standards 2, telescoping into the supporting legs 3, and which are braced by the cross tie members 4 each having a screw threaded aperture 5 therein adapted to receive the threaded end 6 of the rods 7 carrying the hand wheels 8 and having the non-threaded ends 9 bearing against the lower surface of the table top 1, so that when the hand wheels are turned the table top 1 is raised or lowered as may be desired. Rollers 10 are provided at the lower end of each of the legs 3 so as to facilitate the moving of the machine.

On the top of the table 1, approximately centrally between the legs 3, and extending lengthwise of the top, is mounted a bar 11 having grooves 12 in the sides thereof. A series of vertical arms 13, on each side of the rail 11, are movable longitudinally of the table in the grooves 12 and the members of each series are connected together by means of the lazy-tongs 14 secured at the back end to the upright member 15, non-slidable but pivoted to the rail 11, and at the forward end secured to the upright members 16. Secured transversely of the upright members 16, which are slidable in the grooves 12, is a screw threaded block 17, a like block 18 being secured to the upright member 15. These two blocks carry a screw 19 having a hand wheel 20 which serves to spread apart or close together the series of uprights 13 when the hand wheel 20 is operated.

Pivoted to the upper end of the arms 13 are sections 21 of the mold, each section being adapted to open and close laterally by moving the levers 22, one being provided for each section. These levers operate the pivoted links 23, the pivots being vertically slidable in the guide 24 secured to the tie members 25 and 26 connecting the arms 13. These links are pivoted at one end to the reversely curved lever arms 27, which, in turn, are pivoted at a point between their ends to the arms 13 and at their upper ends carry rollers 34 making contact with the sections 21 of the mold. Thus it will be seen that when the lever 22 is raised the various parts of the mold may be made to assume a closed position as shown in Fig. 2 or opened by reason of the pull springs 35, as shown in Fig. 8. The front element 28 of the mold is held in a closed position by means of the notched disk 36 being engaged by the spring actuated plunger 37, which may be retracted by the hand lever 38 so as to be opened. Here attention is called to the fact that when the sections of the mold are in the closed position a narrow opening is left both at the top and bottom, the purpose of which will be set forth as the description proceeds.

Pivoted to the upper ends of the uprights 16 and adapted to swing outward when the mold is opened is a head piece 28 and fixedly secured to the uprights 15 is a rear piece 29. These two pieces coöperate with the mid-sections, above mentioned, to complete the mold when in a closed position. It may be here stated that the body of the mold may be made to resemble any fanciful shape desired without departing from the general construction, and in the form illustrated herein, I have shown the mold as constructed to resemble a pig.

Concentric with the pivot pins, by which the levers 22 are pivoted to the arms 13, are mounted the toothed segments 30 which are engaged by the spring actuated dogs 31 operated through a foot treadle 32. The lever connecting the dogs 31 with the treadle 32 is arranged in such a manner that each of the levers 22 may be operated separately by depressing the respective hand lever 33, or, by depressing the treadle 32, all of the dogs are withdrawn from engagement with the segments 30, and all of the levers 22 are simultaneously released.

The binding device comprises a train of gears two of which, 40 and 41, are secured upon the same shaft and driving a third gear 42 as indicated. The gear 40 is caused to rotate by engaging with a fixed rack 43, secured to the tie bars 25 at each end of the machine; the gears are mounted upon a bracket 47, slidable longitudinally on a plain portion of the rack bar 43, which has formed in its upper surface a number of indentations 48 receptive of the spring actuated plunger 49, whereby the bracket is located with relation to the several sections forming the mold.

Means for actuating the slide are provided by the rod 50 on which is the operating handle 45. A spring ring 51 is also carried by the bracket 47 and adapted to travel around its circumference is an arm 52 secured to the gear 42. The arm carries a tube 53 through which the twine or cord used for binding is passed from the ball 46 whereby the proper lengths are withdrawn to pass around the material contained in the mold thereby rendering binding and tying of the same very convenient.

In operation, to fill the mold, the sections are spread apart and each filled consecutively, the whole being then closed tightly together and pressed.

It will be understood that various modifications from the precise construction and arrangement of parts shown herein may be used without departing from the scope and spirit of the invention.

Having thus described my invention what I claim as new and desire to secure by Letters Patent, is:—

1. A meat pressing apparatus comprising a series of laterally separable mold sections, a supporting frame therefor, said sections being hingedly connected to the frame at their extreme lower ends below the axial center of the mold, a fixed rear section, a transversely hinged front section, means for closing said mold sections inwardly and means to forcibly bring all of said sections into close lateral relation.

2. A meat pressing and binding apparatus, comprising a frame, a bar mounted therein, having grooves in its side edges, a series of upright standards slidably mounted in the grooves, lazy tongs interconnecting said standards, mold sections carried on the upper ends of said standards, means for forcibly bringing the said mold sections together.

3. An apparatus for pressing and binding meat, comprising a series of independently actuated mold sections adapted to coöperate in forming a single mold, levers for pressing said mold sections together, said levers carrying rollers contacting with the exterior of said mold section and means for forcing the end sections of said mold toward each other.

4. An apparatus for pressing and binding meat, comprising a series of independently actuated mold sections adapted to open laterally, said sections being in segment form, hinges for each section, means for operating said sections upon their hinges, an operating mechanism for closing said mold sections laterally, an adjustable table to carry said mold, and a binding device adapted to aid in binding and tying the finished product.

In testimony whereof I affix my signature in the presence of two witnesses.

JOHN BORBÁSH.

Witnesses:
E. W. ALEXANDER,
JOSEPH PÁRTOS.

Copies of this patent may be obtained for five cents each, by addressing the "Commissioner of Patents, Washington, D. C."